United States Patent
Genz et al.

(10) Patent No.: US 12,242,316 B2
(45) Date of Patent: Mar. 4, 2025

(54) SYSTEM AND METHOD FOR IDENTIFYING PRESENCE AND FUNCTION OF COMPONENTS OF DATA PROCESSING SYSTEMS

(71) Applicant: Dell Products L.P., Round Rock, TX (US)

(72) Inventors: Curtis Ray Genz, Round Rock, TX (US); Donald W. Gerhart, Leander, TX (US); Jeffrey Leighton Kennedy, Austin, TX (US); Randy Alton Frazier, New Braunfels, TX (US); Nicole Mutesi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 406 days.

(21) Appl. No.: 18/047,827

(22) Filed: Oct. 19, 2022

(65) Prior Publication Data
US 2024/0134431 A1 Apr. 25, 2024
US 2024/0231453 A9 Jul. 11, 2024

(51) Int. Cl.
*G06F 1/20* (2006.01)
*G06F 1/3296* (2019.01)

(52) U.S. Cl.
CPC ............ *G06F 1/206* (2013.01); *G06F 1/3296* (2013.01)

(58) Field of Classification Search
CPC ................................ G06F 1/206; G06F 1/3296
See application file for complete search history.

(56) References Cited

U.S. PATENT DOCUMENTS

| | | | |
|---|---|---|---|
| 6,389,817 B1* | 5/2002 | Smith | F25B 21/04 62/3.2 |
| 7,698,095 B2 | 4/2010 | Chung et al. | |
| 8,550,702 B2 | 10/2013 | Campbell et al. | |
| 9,581,985 B2 | 2/2017 | Walser et al. | |
| 9,772,664 B1 | 9/2017 | Chou et al. | |
| 9,785,208 B2 | 10/2017 | Lovicott et al. | |
| 9,820,411 B2 | 11/2017 | Alshinnawi et al. | |
| 9,842,003 B2 | 12/2017 | Rao et al. | |
| 9,968,011 B2 | 5/2018 | Shabbir et al. | |
| 10,156,987 B1 | 12/2018 | Gutierrez et al. | |
| 10,191,523 B2 | 1/2019 | Shows et al. | |
| 10,394,294 B2 | 8/2019 | Pfeifer et al. | |
| 10,712,033 B2 | 7/2020 | Atchison et al. | |
| 10,760,809 B2 | 9/2020 | Gillette et al. | |
| 11,009,249 B2 | 5/2021 | Goel et al. | |

(Continued)

*Primary Examiner* — Mark A Connolly
(74) *Attorney, Agent, or Firm* — Womble Bond Dickinson (US) LLP

(57) ABSTRACT

Methods and systems for managing the operation of data processing systems are disclosed. A data processing system may include a computing device that may provide computer implemented services. To provide the computer implemented services, hardware components of the data processing system may need to operate in predetermined manners. To manage the operation of the hardware components, the data processing system may heat them when their temperatures fall outside of thermal operating ranges. To heat the hardware components, the data processing system may implement a dual device detection framework to identify and characterize various devices that may be usable to heat its hardware components.

20 Claims, 7 Drawing Sheets

(56) References Cited

U.S. PATENT DOCUMENTS

| | | | |
|---|---|---|---|
| 2009/0198387 A1* | 8/2009 | Lin | G06F 1/26 |
| | | | 713/2 |
| 2013/0015548 A1 | 1/2013 | Chen et al. | |
| 2014/0027435 A1 | 1/2014 | Chou | |
| 2023/0086310 A1* | 3/2023 | Utz | G06F 1/182 |
| | | | 700/202 |
| 2023/0260864 A1* | 8/2023 | Kondapuram | H05B 1/023 |
| | | | 713/2 |

* cited by examiner

SYSTEM AND METHOD FOR IDENTIFYING PRESENCE AND FUNCTION OF COMPONENTS OF DATA PROCESSING SYSTEMS

FIELD OF THE EMBODIMENTS

Embodiments disclosed herein relate generally to device management. More particularly, embodiments disclosed herein relate to systems and methods for identifying devices usable for thermal management.

BACKGROUND

Computing devices may store data and used stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1A:
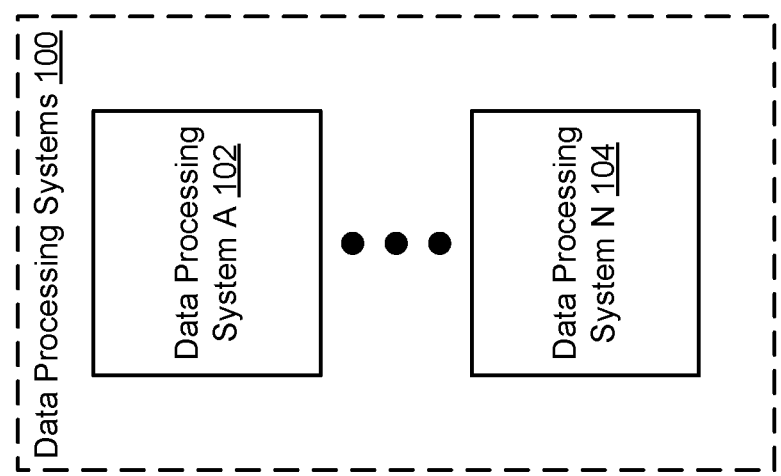
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices.

In general, embodiments disclosed herein relate to methods and systems for managing the operation of data processing system. The data processing system may provide computer implemented services.

To provide the computer implemented services the data processing system may include various hardware components. The hardware components may have thermal operating limits that must be met for the hardware components to operate nominally (e.g., with low probability of error, low chance of damage/failure, etc.).

To maintain the hardware components within the thermal operating limits, the data processing system may include multifunctional bays in which thermal management components such as heaters may be positioned. However, other types of devices may be positioned in the multifunctional bays, and the wide array of devices that may be positioned in the multifunctional bays may communicate via varying communication schemes (e.g., static sideband signaling, one-wire signaling, etc.).

To facilitate detection and use of thermal management components, a thermal manager of the data processing system may implement a dual device detection framework. The dual device detection framework may allow for various type of devices that communication using varying communication schemes to be identified and characterized.

When a heater is identified, the data processing system may take proactive action to address potential impacts of low ambient environmental temperatures. These proactive actions may include, for example, heating procedures to warm hardware components so that they are retained within their thermal operating ranges, modification of cooling procedures to reduce the likelihood of cool gasses taken in from the ambient environment cooling hardware components below their thermal operating ranges, and/or other types of actions to reduce the impact of cool ambient environment temperatures.

By doing so, embodiments disclosed herein may provide a data processing system capable of operating under a wider array of environment conditions by mitigating (e.g., reducing, limiting, etc.) the impact of environmental conditions in which the data processing system resides. Thus, embodiments disclosed herein may address the technical problem of operating condition limitations of data processing systems. The disclosed embodiments may address this problem by providing a data processing system with active heating capabilities that are used proactively ahead of periods of time when the heating capabilities may be unavailable.

In an embodiment, a data processing system that provides computer implemented services is provided. The data processing system may include a multifunctional bay; and a thermal manager adapted to: identify a startup of the data processing system; based on the startup: perform, for the multifunctional bay, a dual device detection procedure for the multifunction bay to identify presence, type, and capability of a device; make a determination regarding whether a heater is present in the multifunctional bay based on an outcome of the dual device detection procedure; in an instance of the determination where the heater is present in the multifunctional bay and an ambient temperature is below a threshold: initiate a heating procedure prior to any temperature sensitive hardware components of the data processing system operate during the startup to warm the temperature sensitive hardware components; and after completing the heating procedure, set operation of the data processing system for cold weather operation and resume operation of the startup to initiate operation of the temperature sensitive hardware components to provide, at least in part, the computer implemented services.

The temperature sensitive hardware components may have an operating temperature range above the threshold.

Performing the dual device detection procedure may include sampling a voltage on a sideband line to the multifunctional bay to obtain a sample voltage; making a first device type determination regarding whether the voltage sample is a static logic high signal; in a first instance of the first device type determination where the voltage sample is a static logic high signal, identifying that the multifunction bay is empty; in a second instance of the first device type determination where the voltage sample is not a static logic low signal: making a second device type determination regarding whether the voltage sample is a static logic low signal.

Performing the dual device detection procedure may also include, in a first instance of the second device type determination where the sample voltage is a static logic low signal: identifying a type and capability of a device in the multifunctional bay using static sideband signal analysis.

Performing the dual device detection procedure may also include, in a second instance of the second device type determination where the sample voltage is not a static logic low signal: identifying a type and capability of a device in the multifunctional bay using one wire signal analysis.

The one wire signal analysis may include communicating with the device via the sideband line.

The static sideband signal analysis may include comparing one or more static voltage levels obtained via one or more of the sideband line and other sideband lines.

In an embodiment, a computer-implemented method is provided. The computer-implemented may provide the functionality of the data processing system and/or components thereof, discussed above.

In an embodiment, a non-transitory media is provided. The non-transitory media may include instructions that when executed by a processor cause the computer-implemented method to be performed.

Turning to FIG. 1A, a block diagram illustrating a system in accordance with an embodiment is shown. The system shown in FIG. 1A may provide any quantity and type of computer implemented services. To provide the computer implemented services, the system of FIG. 1A may include data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may need to operate in a predetermined manner. The predetermined manner of operation may include, for example, executing an operating system, drivers, and/or other type of management entities that mediate, facilitate, or otherwise operate in a manner which enables the applications to operate (e.g., by providing abstracted access to hardware resources used in the execution of the applications).

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation management of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the data processing system.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system or other type of management entity). To enter the predetermine manner of operation conducive to execution of the application, the data processing system may go through a boot process (e.g., a startup) which may be performed by one or more types of management entity such as a basic input-output system and/or other startup management entities. The management entity may perform any number of actions (e.g., a "startup process") to prepare the data processing system to begin execution of an operating system and/or other type of management entity that facilitates execution of applications.

To perform the startup process and provide the computer implemented services, data processing systems 100 may include various hardware components (e.g., integrated circuit-based devices). The hardware components may perform various types of functionalities including, for example, (i) data processing functionality through which the computer implemented services may be provided, (ii) system management functionality through which the operation of the respective data processing systems may be managed, and/or (iii) other types of functionalities.

Any of the hardware components may have limitations on their operation. For example, any of the hardware components may have limitations regarding their temperatures (e.g., hardware components having such limitations being referred to as "temperature sensitive hardware components"). The temperature limitations may include a lower temperature limit and an upper temperature limit. If the temperature of a temperature sensitive hardware components is outside of these limitations, then the temperature sensitive hardware components may be impaired (e.g., may not operate, may operate but in an undesirable manner such as including errors in their operation, may be subject to damage if operated, etc.).

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may include functionality to (i) detect the presence of thermal management components (e.g., heaters, fans, etc.) and (ii) use the thermal management components warm and cool hardware components.

For example, data processing systems 100 may include heaters, fans, and/or other types of components for heating and/or cooling. The heaters and fans may be used to generate flows of gasses. The flows of gasses may be heated by a heater, and/or obtained from a source of cool gas (e.g., an ambient environment, a gas temperature management system, etc.) to provide for warming and/or cooling flows of gasses usable to warm or cool temperature sensitive hardware components.

To decide when and how to generate flows of gasses to warm or cool hardware components, data processing systems 100 may need to be able to identify the presence, type, and functionality of the thermal management components. For example, consider a scenario where a management components is implemented with a thermal manager tasked with maintaining the temperatures of hardware components within their operational ranges. To operate effectively, the thermal manager may need to be aware of the components that it may control to manage the temperatures of the hardware components.

Figure 1B:
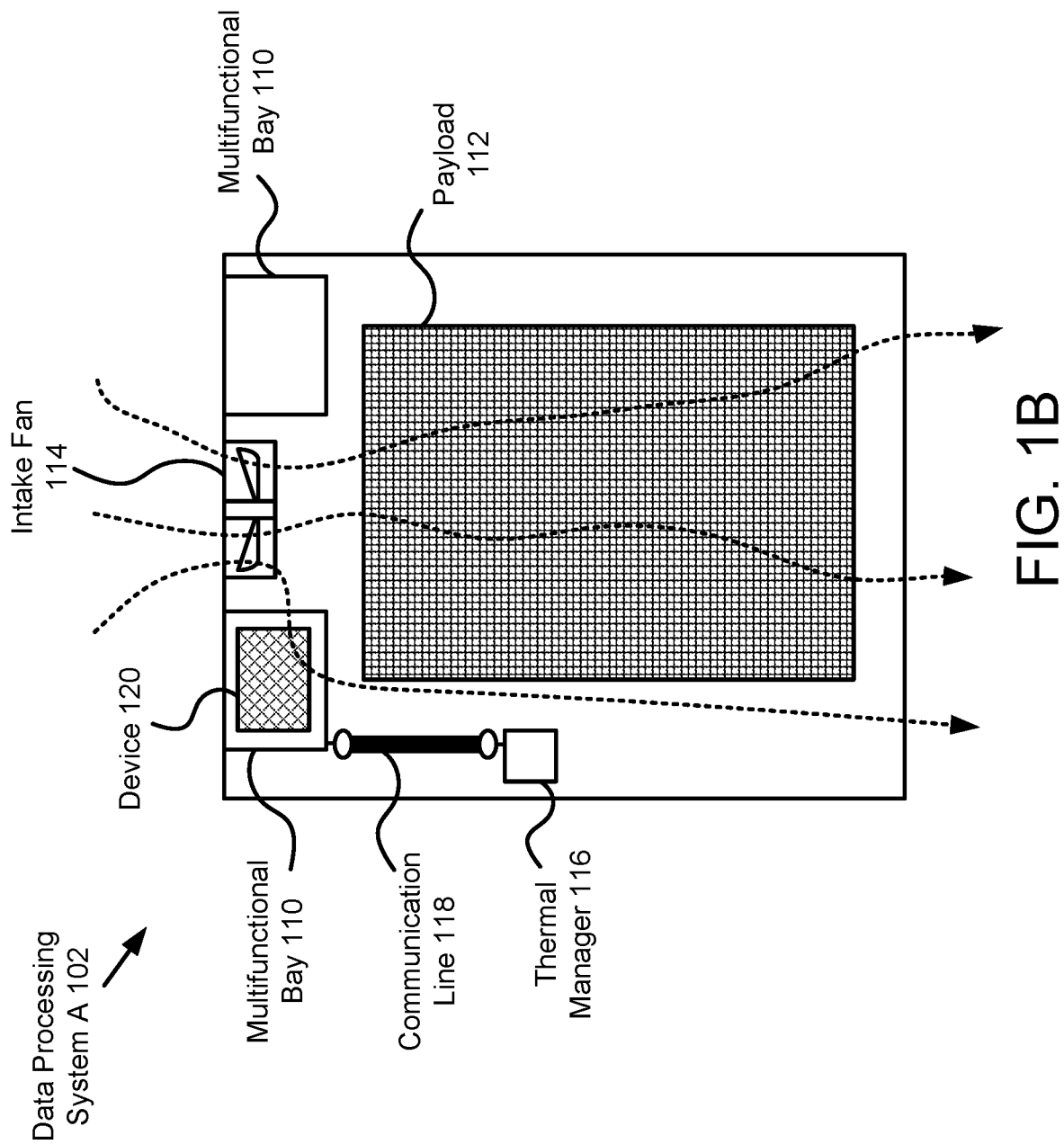
FIG. 1B shows a top view diagram illustrating gas flow in a data processing system in accordance with an embodiment.

To include thermal management components, data processing systems 100 may include multifunctional bays that may accommodate a range of different types of devices including, for example, power supplies, heaters, fans, cooling systems, battery backup systems, and/or other types of hardware components. A management component tasked with managing the operation of the devices in the multifunctional bays may need to ascertain the features of the devices in the multifunctional bays. Refer to FIG. 1B for additional details regarding devices that may be placed in multifunctional bays.

Figure 1C:
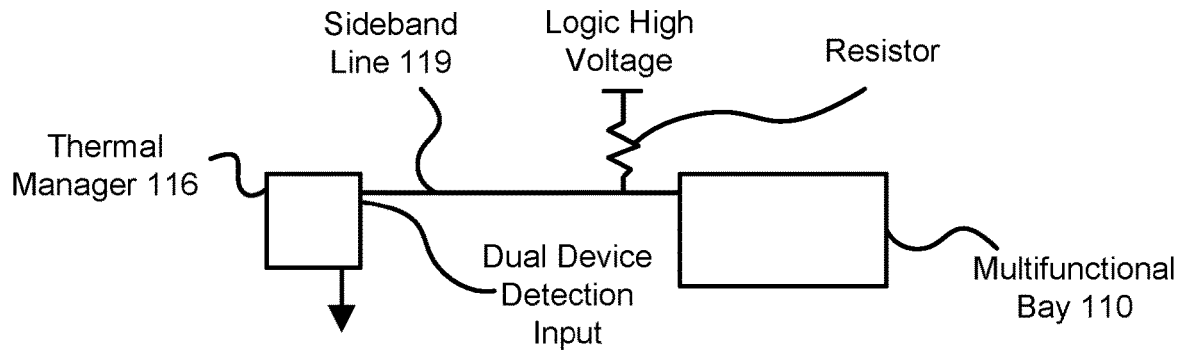
FIGS. 1C-1E show schematic diagram of electrical configurations in accordance with an embodiment.

To facilitate identification of the devices in the multifunctional bays, management components of data processing systems 100 may implement a dual device detection framework. The dual device detection framework may allow a variety of different types of devices that implement different types of signaling frameworks to be identified and characterized. Refer to FIGS. 1B and 1C for additional details regarding the dual detection framework.

When data processing systems 100 identify that thermal management components such as heaters are present in multifunctional bays, data processing systems 100 may take the presence of such devices as an indication that data processing system should take action to retain the temperatures of hardware components within their operational ranges. For example, data processing system 100 may presume that when such heating devices are identified that data processing systems 100 may be located in environments where ambient temperatures may render temperature sensitive hardware components inoperable unless heated. Consequently, data processing systems 100 may take action to improve the likelihood that temperature sensor hardware components are within their thermal operating ranges while operating.

By doing so, a data processing system in accordance with an embodiment may be more likely to successfully place itself in condition to provide desired computer implemented services under a wider variety of operating conditions. Thus, embodiments disclosed herein may address the technical challenge of limited operating conditions of components of data processing systems. The disclosed data processing systems may represent an improvement in computing technology by being more likely to successfully operate in varying operating conditions, and, in particular, an environment where ambient conditions (e.g., temperatures below the thermal operating ranges of the components) may otherwise preclude operation of components of data processing systems 100.

Figure 2:
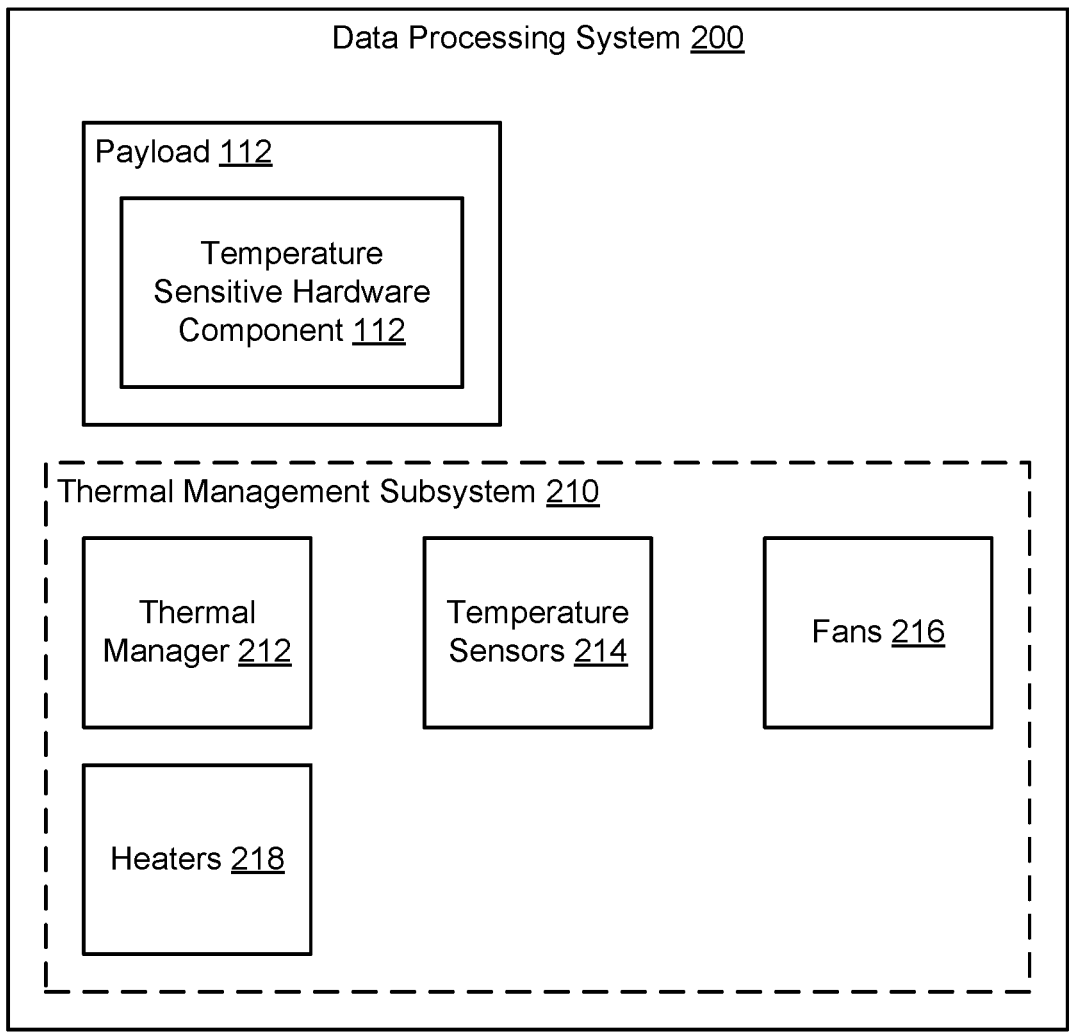
FIG. 2 shows a block diagram illustrating a data processing system in accordance with an embodiment.
Figure 3A:
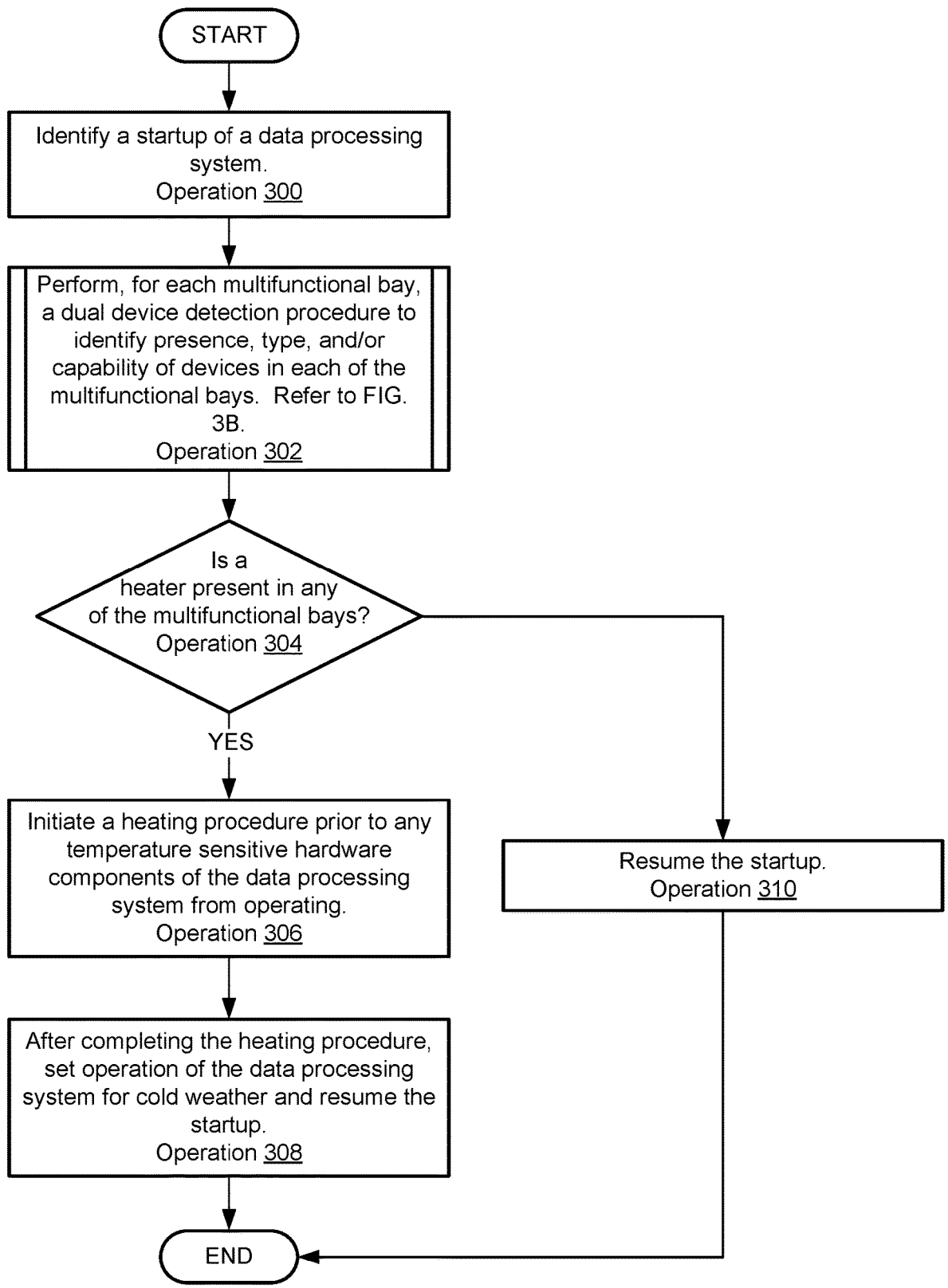
FIG. 3A shows a flow diagram illustrating a method of providing computer implemented services with a data processing system in accordance with an embodiment.
Figure 3B:
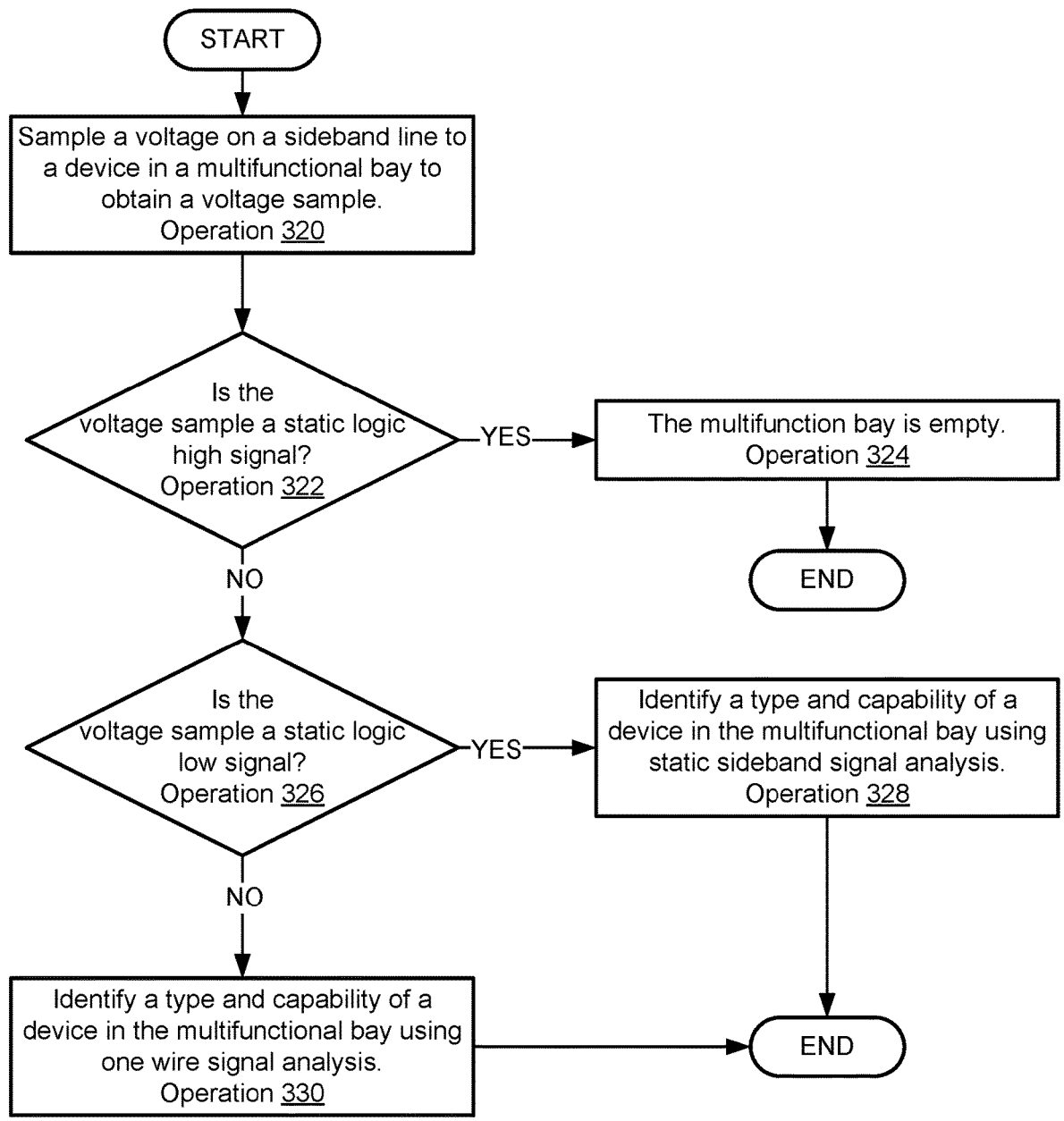
FIG. 3B shows a flow diagram illustrating a method of performing dual device detection to facilitate providing the computer implemented services in accordance with an embodiment.

When providing their functionalities, any of data processing systems 100 may perform all, or a portion, of the methods illustrated in FIGS. 3A-3B. Refer to FIG. 2 for additional details regarding data processing systems.

Any of data processing systems 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4.

The system of FIG. 1A may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1A.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1A as included a limited number of specific components, a system in accordance with an embodiment may include fewer, additional, and/or different components than those illustrated therein.

Figure 1D:
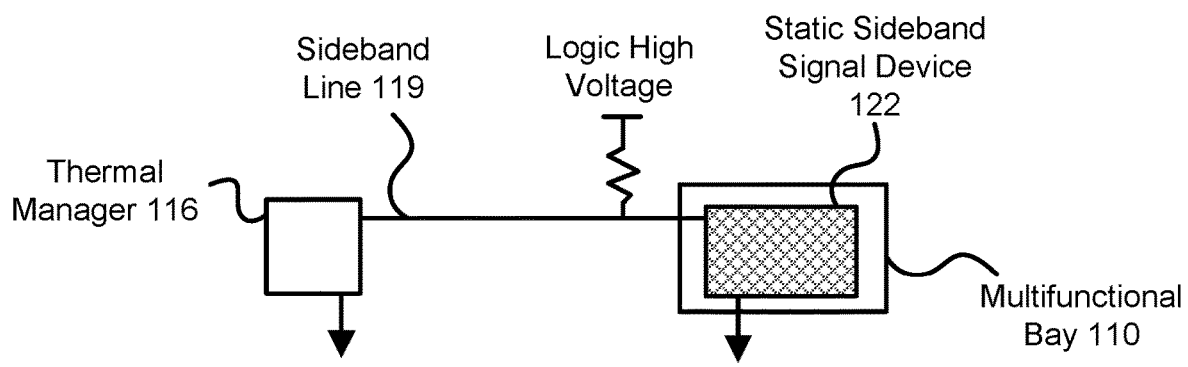
Figure 1E:
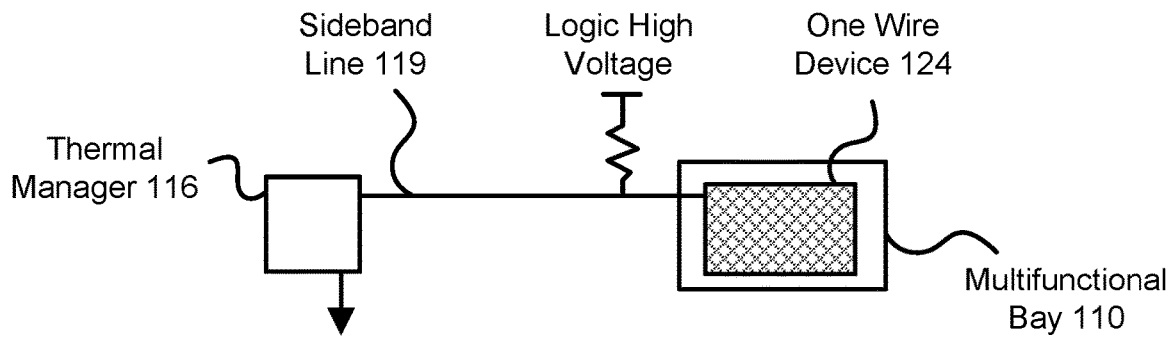

As noted above, data processing systems may be positioned in ambient environments where they may be exposed to ambient temperatures outside of the operating temperature ranges of the components of the data processing systems. To facilitate operation of data processing systems in such environment, heaters may be used to place temperatures of components of data processing systems within the operating temperatures of the hardware components. FIG. 1B shows an example of airflows (e.g., flows of any types of gasses) and heaters that may be used to warm hardware components of data processing systems, and FIGS. 1C-1E shows a diagram illustrating portions of the dual device detection framework through which heaters positioned in multifunctional bays may be identified and distinguished from other types of components such as power supplies.

Turning to FIG. 1B, a top view diagram of data processing system A 102 in accordance with an embodiment is shown. Any of data processing systems 100 may be similar to data processing system A 102.

As seen in FIG. 1B, data processing system A 102 may any number of multifunctional bays (e.g., 110). A multifunctional bay may include a physical structure for receiving various types of devices. The multifunctional bays may also include, for example, wiring harnesses to operably connect the devices positioned in the multifunctional bays to other components. The wiring harness may be connected to, for example, a communication line (e.g., 118). Multifunctional bay 110 may further include, for example, mechanical attachment features (e.g., bolt holes, sliding locks, mechanical interference generation features, etc.) to fixedly secure a device within multifunction bay 110, and/or other types of components to facilitate integration of devices into data processing system A 102.

Communication line 118 may facilitate sideband communications (and/or other types of communications) between thermal manager 116 (e.g., a management component tasked with managing operation of thermal management components such as heaters positioned in multifunctional bay 110) and a device positioned in multifunctional bay 110. Communication line 118 may be implemented with, for example, cabling, circuit trances, active electronic components, passive electronic components, and/or other devices. Refer to FIGS. 1C-1E for additional details regarding electrical connections facilitated by communication line 118.

Generally, the wiring harness of multifunctional bay 110 may be adapted to (e.g., include specific connectors to facilitate connection to) connect sideband communication channels of a device (e.g., 120) positioned in a multifunctional bay to dual device detection inputs of thermal manager 116. The wiring harness of multifunctional bay 110 may also be adapted to connect one wire communication channels of a device position in the multifunctional bay to the dual device connection inputs of thermal manager 116. The dual detection inputs of thermal manager 116 may allow thermal manager 116 to ascertain the manner in which device 120 communicates with other devices. For example, the dual detection inputs may include functionality to sample voltages sent over communication line 118 and/or send voltages over communication line 118 to device 120 (e.g., in a one wire communication scheme).

Thermal manager 116 may be tasked with managing the thermal conditions of data processing system A 102. For example, payload 112 may include any number of hardware components, any of which may be a temperature sensitive hardware component.

To manage the thermal condition of these and/or other components, thermal manager 116 may utilize a fan (e.g., intake fan 114) to generate a flow of gas (e.g., illustrated in FIG. 1B with wavy dashed line terminating in arrows) and, when a heater is positioned in a multifunctional bay, use the heater to warm the gas. The warmed gas flow may be used to place and maintain the temperatures of the components of data processing system A 102 in their thermal operating ranges. Refer to FIG. 2 for additional details regarding the functionality of thermal manager 116.

While illustrated in FIG. 1B with respect to specification locations and having specific shapes/sizes, it will be appreciated that multifunctional bays, thermal manager 116, communication line 118, intake fan 114, and payload may be positioned at different locations and/or may be of different shapes/sizes than depicted here without departing from embodiments disclosed herein.

While illustrated in FIG. 1B with a limited number of specific components, a data processing system may include additional, fewer, and/or different components without departing from embodiments disclosed herein.

Additionally, while illustrated in FIG. 1B as being connected to thermal manager 116, data processing system A 102 may include any number of management components between communication line 118 and thermal manager 116. These other management components may perform identification for devices in multifunctional bay 110 and provide information regarding the devices to other components such as thermal manager 116. Thus, thermal manager 116 may, in some embodiments, encompass the functionality performed by multiple management components. Accordingly, it will be appreciated that any function of thermal manager 116 described herein may be delegated to another management component (not shown) of data processing system A 102. Similarly, the management component that identifies device 120 may provide information regarding device 120 to any number of other management components that may use the aforementioned information to perform any number of processes (e.g., power distribution management by a power manager).

To facilitate use of devices positioned in multifunctional bays, a data processing system may interconnect a device within a multifunctional bay and a thermal manager as part of a dual device detection framework. When doing so, various electrical connections may be made to facilitate identification, use, etc. of the device by the thermal manager. FIGS. 1C-1E illustrate circuit schematic diagrams representing the various circuit connections that may be formed when different types of devices are placed in a multifunctional bay.

Turning to FIG. 1C, a first schematic diagram illustrating the electrical connections when multifunctional bay 110 is empty in accordance with an embodiment is shown. As seen in FIG. 1C, when thermal manager 116 is connected to multifunctional bay 110 via sideband line 119 (e.g., a wire, circuit card trace, etc.) of communication line 118 (e.g., which may include multiple lines), the dual device detection input of thermal manager 116 may be connected to a logic high voltage via a resistor, but may otherwise not be connected. Consequently, when a voltage at the dual device detection input is sampled, it may be logic high value and unchanging in time.

Turning to FIG. 1D, a second schematic diagram illustrating the electrical connections when a static sideband signal device 122 is positioned in multifunctional bay 110 in accordance with an embodiment is shown. As seen in FIG. 1D, when thermal manager 116 is connected to multifunctional bay 110 via sideband line 119 of communication line 118, the dual device detection input of thermal manager 116 may be connected to a logic high voltage via a resistor, but may also be connected to ground via static sideband signal device 122. Generally, the resistor to the logic high voltage may be of high value. Consequently, when a voltage at the dual device detection input is sampled, it may be a logic low value and unchanging in time (e.g., drawn low due to a low resistance to ground presented by static sideband signal device 122, which may be presented actively through output of a fixed voltage by static sideband signal device 122).

Turning to FIG. 1E, a third schematic diagram illustrating the electrical connections when a one wire device 124 is positioned in multifunctional bay 110 in accordance with an embodiment is shown. As seen in FIG. 1E, when thermal manager 116 is connected to multifunctional bay 110 via sideband line 119 of communication line 118, the dual device detection input of thermal manager 116 may be connected to a logic high voltage via a resistor, but may also be connected to the one wire channel of one wire device 124. Consequently, when a voltage at the dual device detection input is sampled by thermal manager 116, a time varying voltage may be present due to the signal modulated onto sideband line 119 by one wire device 124.

Thus, as seen in FIGS. 1C-1E, thermal manager 116 may identify a communication scheme (e.g., static sideband or one-wire) implemented by a device through voltage sampling.

It will be appreciated that the schematic diagrams shown in FIGS. 1C-1E may be simplified here for conciseness.

Turning to FIG. 2, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may include hardware components (e.g., processors, memory modules, storage devices, etc., not shown in FIG. 2) as part of payload 112. The hardware components may include any number of temperature sensitive components (e.g., 112).

To manage the temperature of temperature sensitive components, data processing system 200 may include thermal management subsystem 210. Thermal management subsystem 210 may manage the thermal state of various hardware components of data processing system 200. To manage the thermal states, thermal management subsystem 210 include thermal manager 212, any number of temperature sensors 214, any number of fans 216, and any number of heaters 218 which may be positioned in multifunctional bays.

Thermal manager 212 may manage the operation of the other components of thermal management subsystem 210. When doing so, thermal manager 212 may (i) implement a dual device detection framework to identify and characterize devices, and (ii) use the identified devices (e.g., heaters 218), fans 216, and/or temperature sensors 214 to retain the temperatures of temperature sensitive components within thermal operating ranges.

When providing its functionality, thermal manager 212 may perform all or a portion of the methods shown in FIGS. 3A-3B.

In an embodiment, thermal manager 212 is implemented with a programmable logic device. The programmable logic device may include software to perform dual device detection, calculate operating points of fans 216 and heaters 218 to maintain temperatures of hardware components within thermal operating ranges, and direct operation of fans 216 and heaters 218.

In an embodiment, thermal manager 212 is implemented using a hardware device including circuitry. The hardware device may be, for example, a programmable logic device, digital signal processor, a field programmable gate array, an application specific integrated circuit, or another type of hardware component usable to process data in a data processing system environment. The circuitry may be adapted to cause the hardware device to perform the functionality of thermal manager 212. Thermal manager 212 may be implemented using other types of hardware devices without departing embodiment disclosed herein.

In an embodiment, thermal manager 212 is implemented using a processor adapted to execute computing code stored on a persistent storage that when executed by the processor performs the functionality of thermal manager 212 discussed throughout this application. The processor may be a hardware processor including circuitry such as, for example, a central processing unit, a processing core, or a microcontroller. The processor may be other types of hardware devices for processing information without departing embodiment disclosed herein.

While illustrated in FIG. 2 with a limited number of specific components, a data processing system may include additional, fewer, and/or different components without departing from embodiments disclosed herein.

As discussed above, the components of FIGS. 1A-2 may perform various methods to increase the likelihood of data processing systems being able to provide computer implemented services. FIGS. 3A-3B illustrate methods that may be performed by the components of FIGS. 1A-2. In the diagrams discussed below and shown in these figures, any of the operations may be repeated, performed in different orders, omitted, and/or performed in parallel with or a partially overlapping in time manner with other operations.

Turning to FIG. 3A, a flow diagram illustrating a method of managing the temperatures of hardware components of a data processing system in accordance with an embodiment is shown. The method may be performed, for example, by a data processing system, a thermal manager, and/or other components illustrated in FIGS. 1A-2.

At operation 300, a startup of a data processing system is identified. The startup may be identified by monitoring operation of the data processing system, via a message passing system that the data processing system uses to notify entities that it has started, by a management component (e.g., a thermal manager) being powered up, and/or via other methods.

As part of the startup, operation of temperature sensitive hardware components may be delayed. For example, a startup (or portions thereof) may be paused.

At operation 302, for each multifunctional bay of the data processing system, a dual device detection procedure is performed to identify a presence, type, and/or capability of devices in each of the multifunctional bays. The dual device detection procedure may include (i) sampling voltages, and (ii) when presence of a device is detected based on the sampled voltages, identifying a type and capability of each device.

In an embodiment, the dual device detection procedure is performed via the method illustrated in FIG. 3B. The dual device detection procedure may be performed via other methods without departing from embodiments disclosed herein.

At operation 304, a determination, based on the outcome of the dual device detection procedure, is made regarding whether a heater is present in any of the multifunctional bays. The determination may be made by comparing the types of any identified devices to a list of known heaters, by querying a database (may be remote to the data processing system, may include information regarding heaters) based on the types of the devices to identify whether any of the devices are heaters, and/or via other methods.

If it is determined that any of the devices present in any of the multifunctional bays are heaters, then the method may proceed to operation 306. Otherwise, the method may proceed to operation 310.

At operation 306, a heating procedure is initiated prior to any of the temperature sensitive hardware components operating. As noted with respect to operation 300, operation of the temperature sensitive hardware components may be initially delayed. The heating procedure may be performed by managing the operating of the heater(s) (e.g., those identified in operations 302-304) and fans of a thermal management subsystem based on the heating procedure. For example, the heating procedure may specify duty rates for the fans and heaters, for various periods of time. Performing the heating procedure may warm the temperature sensitive component to be within their thermal operating ranges.

At operation 308, after completing the heating procedure, operation of the data processing system may be set for cold weather, and the startup may be resumed. The data processing system may be set for cold weather by, for example, storing a flag or other indicator that cold weather operating procedures (e.g., stored in storage of a thermal manager) should be implemented (e.g., rather than standard operating procedures). The cold weather operating procedures may include various temperature checks and heater/fan activations to retain temperatures of the temperature sensitive components within their operating ranges.

The startup may be resumed by, for example, resuming the startup process, powering the temperature sensitive hardware components, and/or performing other actions that may place the data processing system into condition to provide the computer implemented services and/or to provide the computer implemented services using, at least in part, the temperature sensitive hardware components.

The method may end following operation 308.

Returning to operation 304, the method may proceed to operation 310 following operation 304 when no heaters are present in any of the multifunctional bays.

At operation 310, the startup is resumed. The startup may be resumed without performing the heating procedure described with respect to operation 306, or setting operation for cold weather as described with respect to operation 308. Consequently, the data processing system may, during and after completion of the startup, may operate with the expectation that heating of temperature sensitive hardware components is unnecessary (e.g., that the ambient temperature will stay within the operating ranges of the temperature sensitive hardware components).

The method may end following operation 310.

Turning to FIG. 3B, a flow diagram illustrating a method of performing dual device detection in accordance with an embodiment is shown. The method may be performed, for example, by a data processing system, a thermal manager, and/or other components illustrated in FIGS. 1A-2.

At operation 320, a voltage on a sideband line to a device in a multifunctional bay is sampled to obtain a voltage sample. The voltage may be sampled by using an analog to digital converter to generate a digital representation of the voltage, and/or via other methods.

At operation 322, a determination is made regarding whether the voltage sample is a static logic high signal. The magnitude of the voltage sample may be compared to a high logic voltage threshold to ascertain whether the voltage sample is a static logic high signal.

If the voltage signal is a static logic high signal, then the method may proceed to operation 326. Otherwise, the method may proceed to operation 324.

At operation 324, it may be determined that that multifunctional bay is empty (e.g., as shown in FIG. 1C).

The method may end following operation 324.

Returning to operation 322, the method may proceed to operation 326 if the voltage signal is not a static logic high signal.

At operation 326, a determination is made regarding whether the voltage sample is a static logic low signal. The magnitude of the voltage sample may be compared to a logic low voltage threshold to ascertain whether the voltage sample is a static logic low signal.

While described with respect to logic high and logic low, the determination may be made by comparing the magnitude of the voltage sample to a range of different threshold voltages which may correspond to different types of devices. The different voltage levels thresholds may indicate ranges of voltage which, when identified as being present in the sample voltage, indicate that the corresponding device is present.

If the voltage sample is a static logic low signal, then the method may proceed to operation 328 following operation 326. Otherwise, the method may proceed to operation 330.

At operation 328, a type and capability of a device in the multifunctional bay is identified using sideband signal analysis. The sideband signal analysis may be performed by using the voltage levels of sideband signal provided by the device to lookup types and capabilities of the device (e.g., using a data structure that associates voltage levels with these characteristics). For example, the static sideband voltage levels (e.g., from various lines) may be used to perform one or more lookups in tables or other types of data structures.

The method may end following operation 328.

Returning to operation 326, the method may proceed to operation 330 if the voltage signal is not a static logic low signal. In other words, the method may proceed to operation 330 if the voltage sample includes a time varying voltage representative of a one-wire communication scheme (e.g., which may use time varying signals to communicate information rather than static voltage signals).

At operation 330, a type and capability of the device in the multifunctional bay is identified using one wire signal analysis. The one wire signal analysis may be performed by exchanging information over the sideband line using a one-wire communication protocol. The information may include a type, capability, and/or other information regarding the device. For example, the device may identify itself as being a heater, or another type of device via the one-wire communication protocol.

The method may end following operation 330.

Using the method illustrated in FIG. 3B, a data processing system may be able to identify a broader array of devices by implementing a dual device detection framework that does not presume that any device which may be connected is going to operate in accordance with a static or time varying communication scheme. Rather, the data processing system may sample signals on the line interconnecting a thermal manager and an unknown device to ascertain how the device is adapted to communicate information about itself.

Thus, a data processing system in accordance with embodiments disclosed herein may be more likely to provide desired computer implemented services under a wider variety of environmental conditions (e.g., even sub-zero environments) by improving the likelihood that thermal management devices such as heaters are correctly identified and used to retain temperatures of hardware components within corresponding thermal operating ranges.

Figure 4:
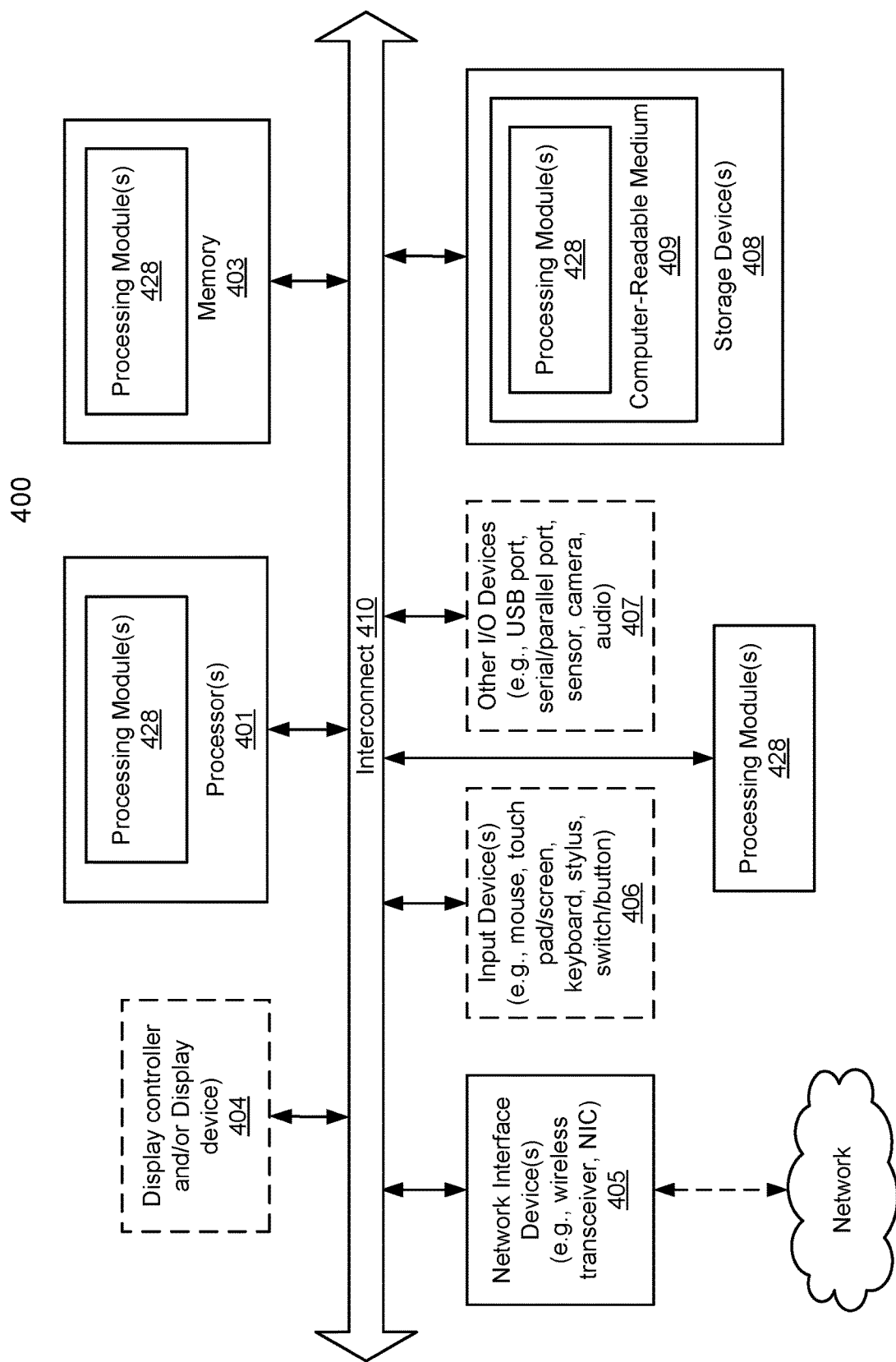
FIG. 4 shows a block diagram illustrating a computing device in accordance with an embodiment.

Any of the components illustrated in FIGS. 1A-2 may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machineaccessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system that provides computer implemented services, the data processing system comprising:
   a multifunctional bay; and
   a thermal manager adapted to:
      identify a startup of the data processing system;
      based on the startup:
         perform, for the multifunctional bay, a dual device detection procedure for the multifunction bay to identify presence, type, and capability of a device;
         make a determination regarding whether a heater is present in the multifunctional bay based on an outcome of the dual device detection procedure;
         in an instance of the determination where the heater is present in the multifunctional bay and an ambient temperature is below a threshold:
            initiate a heating procedure prior to any temperature sensitive hardware components of the data processing system operate during the startup to warm the temperature sensitive hardware components; and
            after completing the heating procedure, set operation of the data processing system for cold weather operation and resume operation of the startup to initiate operation of the temperature sensitive hardware components to provide, at least in part, the computer implemented services.

2. The data processing system of claim 1, wherein the temperature sensitive hardware components have an operating temperature range above the threshold.

3. The data processing system of claim 1, wherein performing the dual device detection procedure comprises:
   sampling a voltage on a sideband line to the multifunctional bay to obtain a sample voltage;
   making a first device type determination regarding whether the voltage sample is a static logic high signal;

in a first instance of the first device type determination where the voltage sample is a static logic high signal, identifying that the multifunction bay is empty;

in a second instance of the first device type determination where the voltage sample is not a static logic low signal:

making a second device type determination regarding whether the voltage sample is a static logic low signal.

4. The data processing system of claim 3, wherein performing the dual device detection procedure further comprises:

in a first instance of the second device type determination where the sample voltage is a static logic low signal:

identifying a type and capability of a device in the multifunctional bay using static sideband signal analysis.

5. The data processing system of claim 4, wherein performing the dual device detection procedure further comprises:

in a second instance of the second device type determination where the sample voltage is not a static logic low signal:

identifying a type and capability of a device in the multifunctional bay using one wire signal analysis.

6. The data processing system of claim 5, wherein the one wire signal analysis comprises communicating with the device via the sideband line.

7. The data processing system of claim 6, wherein the static sideband signal analysis comprises comparing one or more static voltage levels obtained via one or more of the sideband line and other sideband lines.

8. A computer-implemented method for providing computer implemented services with a data processing system, the method comprising:

identifying a startup of the data processing system;
based on the startup:
performing, for a multifunctional bay of the data processing system, a dual device detection procedure for the multifunction bay to identify presence, type, and capability of a device, the dual device detection being performed with a sideband line interconnecting the multifunctional bay and a thermal manager;

making a determination regarding whether a heater is present in the multifunctional bay based on an outcome of the dual device detection procedure;

in an instance of the determination where the heater is present in the multifunctional bay and an ambient temperature is below a threshold:

initiating a heating procedure prior to any temperature sensitive hardware components of the data processing system operate during the startup to warm the temperature sensitive hardware components; and after completing the heating procedure, setting operation of the data processing system for cold weather operation and resuming operation of the startup to initiate operation of the temperature sensitive hardware components to provide, at least in part, the computer implemented services.

9. The computer-implemented method of claim 8, wherein the temperature sensitive hardware components have an operating temperature range above the threshold.

10. The computer-implemented method of claim 8, wherein performing the dual device detection procedure comprises:

sampling a voltage on a sideband line to the multifunctional bay to obtain a sample voltage;

making a first device type determination regarding whether the voltage sample is a static logic high signal;

in a first instance of the first device type determination where the voltage sample is a static logic high signal, identifying that the multifunction bay is empty;

in a second instance of the first device type determination where the voltage sample is not a static logic low signal:

making a second device type determination regarding whether the voltage sample is a static logic low signal.

11. The computer-implemented method of claim 10, wherein performing the dual device detection procedure further comprises:

in a first instance of the second device type determination where the sample voltage is a static logic low signal:

identifying a type and capability of a device in the multifunctional bay using static sideband signal analysis.

12. The computer-implemented method of claim 11, wherein performing the dual device detection procedure further comprises:

in a second instance of the second device type determination where the sample voltage is not a static logic low signal:

identifying a type and capability of a device in the multifunctional bay using one wire signal analysis.

13. The computer-implemented method of claim 12, wherein the one wire signal analysis comprises communicating with the device via the sideband line.

14. The computer-implemented method of claim 13, wherein the static sideband signal analysis comprises comparing one or more static voltage levels obtained via one or more of the sideband line and other sideband lines.

15. A non-transitory machine-readable medium having instructions stored therein, which when executed by a processor, cause a data processing system to perform operations for providing computer implemented services with a data processing system, the operations comprising:

identifying a startup of the data processing system;
based on the startup:
performing, for a multifunctional bay of the data processing system, a dual device detection procedure for the multifunction bay to identify presence, type, and capability of a device, the dual device detection being performed with a sideband line interconnecting the multifunctional bay and a thermal manager;

making a determination regarding whether a heater is present in the multifunctional bay based on an outcome of the dual device detection procedure;

in an instance of the determination where the heater is present in the multifunctional bay and an ambient temperature is below a threshold:

initiating a heating procedure prior to any temperature sensitive hardware components of the data processing system operate during the startup to warm the temperature sensitive hardware components; and after completing the heating procedure, setting operation of the data processing system for cold weather operation and resuming operation of the startup to initiate operation of the temperature sensitive hardware components to provide, at least in part, the computer implemented services.

16. The non-transitory machine-readable medium of claim 15, wherein the temperature sensitive hardware components have an operating temperature range above the threshold.

17. The non-transitory machine-readable medium of claim 15, wherein performing the dual device detection procedure comprises:
sampling a voltage on a sideband line to the multifunctional bay to obtain a sample voltage;
making a first device type determination regarding whether the voltage sample is a static logic high signal;
in a first instance of the first device type determination where the voltage sample is a static logic high signal, identifying that the multifunction bay is empty;
in a second instance of the first device type determination where the voltage sample is not a static logic low signal:
making a second device type determination regarding whether the voltage sample is a static logic low signal.

18. The non-transitory machine-readable medium of claim 17, wherein performing the dual device detection procedure further comprises:
in a first instance of the second device type determination where the sample voltage is a static logic low signal:
identifying a type and capability of a device in the multifunctional bay using static sideband signal analysis.

19. The non-transitory machine-readable medium of claim 18, wherein performing the dual device detection procedure further comprises:
in a second instance of the second device type determination where the sample voltage is not a static logic low signal:
identifying a type and capability of a device in the multifunctional bay using one wire signal analysis.

20. The non-transitory machine-readable medium of claim 19, wherein the one wire signal analysis comprises communicating with the device via the sideband line.

* * * * *